3,373,011
COMPOSITION AND METHOD FOR SUPPRESSING PLANT GROWTH
Dorsey R. Mussell, Clare, Mich., assignor to The Dow Chemical Company, Midland, Mich., a corporation of Delaware
No Drawing. Continuation-in-part of application Ser. No. 194,704, May 14, 1962. This application Oct. 10, 1963, Ser. No. 315,335
9 Claims. (Cl. 71—126)

This application is a continuation-in-part of application Ser. No. 194,704, filed May 14, 1962, now abandoned.

This invention is concerned with the alteration or modification of the growth of plants and plant parts and is particularly concerned with the suppression of the growth of undesirable vegetation and with compositions and methods for the control of the growth of germinant seeds, emerging seedlings and established plants of many undesirable weed species.

It is an object of the present invention to provide a new and improved method for altering or modifying the growth of plants and plant parts. Another object is the provision of a new and improved method for the control of the growth of undesirable vegetation. A further object is the provision of a method for the control of many undesirable weeds and particularly those of small seeded grasses in growth media planted with or supporting the growth of any of many species of broadleaf crop plants. An additional object is the provision of novel compositions adapted to be employed for the accomplishment of the new method of growth alteration. Other objects will become apparent from the following specification and claims.

According to the present invention it has been discovered that the growth of plants and plant parts can be altered or modified by applying to a plant part a growth-altering amount of a styrene compound of the formula

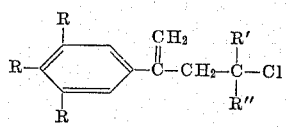

In the above and succeeding formulae herein, each R independently represents a member selected from the group consisting of hydrogen, bromo, chloro, and loweralkyl being of from 1 to 3, inclusive, carbon atoms; R' represents a member selected from the group consisting of bromo and chloro; and R'' represents a member selected from the group consisting of hydrogen, methyl, and chloro. Whenever, in the present specification and claims, the term "styrene compound" or "styrene compounds" is employed, it designates only compound of the above definition.

More particularly, it has been discovered that the growth of germinant seeds, seedlings and established vegetation can be suppressed by exposing the germinant seeds, seedlings or the roots or above-ground portions of the growing plants to the action of a growth-altering amount of styrene compound.

The present invention is concerned essentially with the killing of undesired plants or with inhibiting or suppressing the growth of undesired plants: any such effect is sought, according to the present invention, for its corollary benefit to desired plants, or for safety fom such fire hazard as comes from undesired vegetation, or for traffic safety free from obstruction of vision, as at road intersections, and the like.

To derive the desired advantages from the practice of the present invention, it is not always necessary to effect an immediate and acute kill of undesired plants. In the presence of desired vegetation, such altering or disordering of the growth of undesired vegetation as gives desired plants a decisive competitive advantage is often sufficient and may be preferred. In the absence of desired vegetation, it is usually sufficient to employ a practice of the present invention that will so alter the growth of undesired vegetation that it is more than usually susceptible of injury and death from, for example, drouth, cultivation, winter-killing, nematodes, insects, and fungus injury, and the like.

Hence, it is always an objective of the present invention to bring about a decisive adverse effect upon undesired plants and this is usually sought by employing a herbicidal embodiment of the present invention. However, in view of the natural factors uniformly present, altering adversely the growth of undesired plants often brings about the desired effect.

As employed in the present specification and claims, the terms "growth-altering" and "growth-altering amount" are directed to causing an effect or employing an embodiment necessary to produce such effect, respectively, which effect is one of killing of the plant to which styrene compound is applied, suppression of the treated plant so that its further growth presents no deterrent to the growth of other desirable plants, or inhibition of the growth of the treated plant which in combination with naturally occurring conditions results in the eventual suppression or killing of the treated plant.

Representative compounds to be employed according to the present invention include:

α-(2,2,2-trichloroethyl)styrene;
α-(2,2,2-trichloroethyl)-3,4,5-trichlorostyrene;
α-(2,2,2-trichloroethyl)-meta-isopropylstyrene;
α-(2,2-dichloroethyl)-3,5-dibromostyrene;
α-(2,2,2-trichloroethyl)-para-isopropylstyrene;
α-(2-bromo-2-chloroethyl)-3,4,5-trimethylstyrene;
α-(2,2,2-trichloroethyl)-para-methylstyrene;
α-(2-bromo-2-chloropropyl)-3-bromo-5-ethylstyrene;
α-(2,2,2-trichloroethyl)-para-chlorostyrene;
α-(2-bromo-2-chloroethyl)-para-n-propylstyrene;
α-(2,2-dichloroethyl)styrene;
α-(2,2-dichloropropyl)-para-chlorostyrene;
α-(2-bromo-2-chloroethyl)styrene;
α-(2-bromo-2-chloroethyl)-para-methylstyrene;
α-(2,2-dichloroethyl)-para-methylstyrene;
α-(2-bromo-2-chloropropyl)styrene;
α-(2,2,2-trichloroethyl)-3,4-dichlorostyrene;
α-(2,2,2-trichloroethyl)-para-ethylstyrene;
α-(2,2-dichloroethyl)-3,4-dichlorostyrene;
α-(2,2,2-trichloroethyl)-3-ethyl-5-n-propylstyrene;
α-(2,2,2-trichloroethyl)-3-methylstyrene;
α-(2-bromo-2-chloroethyl)-para-chlorostyrene;
α-(2,2,2-trichloroethyl)-3,4-dimethylstyrene;
α-(2,2-dichloroethyl)-3,4-dimethylstyrene; and
α-(2,2-dichloropropyl)styrene.

These compounds are liquids or crystalline solids at room temperature. They are somewhat soluble in many common organic solvents and of very low solubility in water. They have been found to have a high toxicity to the germinant seeds and seedlings of many small-seeded grasses. Thus, they can be employed for the selective control of small-seeded grasses in growth media planted with or supporting the growth of many species of broadleaf crop plants such as beets, radishes, cucumbers, beans, flax, cotton, soybeans, peanuts, fruit bushes, vines and trees, and nursery stock. Also, styrene compound can be employed for the selective control of crabgrass and other grasses in, for example, the Solanaceae and Cruciferae. It has been further discovered that styrene compound can be employed to remove "weedy" members of the Setaria family, such as Japanese millet, from "crop" members of the Setaria family, such as German millet.

The application of styrene compound to plants and plant parts and their habitats gives rise to varying degrees of response depending upon the nature of the plant or seed, the stage of growth or maturity of the plant, and the dosage at which the exposure is carried out as well as the weather conditions of temperature and moisture and perhaps other factors incompletely known. When large dosages are applied to the foliage of plants a substantially complete kill is obtained. The distribution of large dosages in growth medium controls the growth of germinant seeds, seedlings and established plants. This approaches a sterilizing action. The weathering action of sun and rain, and possibily the decomposition of styrene compounds by the action of bacteria and other soil organisms eventually frees the growth media of styrene compound. Soil or foliar applications of more dilute dosages of a styrene compound suppress the growth of the germinant seeds and seedlings of many small-seeded grasses while having little or no effect upon the seeds, emerging seedlings or established plants of many cereal grains and broadleaf crop plants. Thus, styrene compound can be employed for the selective control of the growth of the seeds and seedlings of small seeded grasses in plantings or stands of broadleaf crop plants.

The application to a plant part of a growth-altering amount of a styrene compound is essential and critical for the practice of the present invention. The exact dosage to be supplied is dependent upon the plant species and the stage of growth thereof as well as the plant part to be exposed to the styrene compound. In non-selective foliage treatments, good results are obtained when from 1.0 to 200 pounds or more of styrene compound are applied per acre. In non-selective applications to growth media, good results are obtained when a dosage of styrene compound is supplied in the amount of from about 0.5 to 250 parts or more by weight per million parts by weight of the medium. In non-selective applications to soil, good results are obtained when styrene compound is distributed at a rate of from about 0.5 to 200 pounds or more per acre and through such a cross section of the soil as to provide for the presence therein of an effective concentration of styrene compound. In such application, it is desirable that the compound be distributed to a depth of at least 0.5 inch and at a substantially uniform dosage of at least 0.2 pound per acre inch of soil. In selective applications to foliage for the control of many undesirable weeds, and especially the seedlings of small-seeded grasses in many desired broadleaf plants, a substantially uniform dosage of from about 1.0 to 75 pounds of styrene compound per acre can be employed. In selective applications to growth media for the control of the germinant seeds and seedlings of many undesirable weeds, and especially those of small-seeded grasses in areas planted with the seeds of desired broadleaf plants or supporting the growth of such plants, a dosage of from 0.5 to 25 parts by weight of styrene compound per million parts by weight of soil has been found satisfactory. Depending on species response, heavier applications often give good selective weed control. In all selective applications, the exact dosage to be employed is dependent upon the resistance of the broadleaf crop plants or their seeds to the styrene compound employed, and related factors.

The method of the present invention can be carried out by applying an unmodified compound to a plant part. However, the present method also embraces the employment of a liquid or dust composition containing styrene compound. In such usage the compound can be modified with one or a plurality of herbicide carriers such as water, petroleum distillates or other liquid carriers; and cooperating substances such as surface active dispersing agents; and finely divided solids. Depending upon the concentration of styrene compound, such augmented compositions are adapted to be distributed in the soil, or employed as concentrates and subsequently diluted with additional herbicide carrier to produce the ultimate treating compositions.

Such composition comprising styrene compound and herbicide carrier, with or without other cooperating substance, facilitates the practice of the present invention, and there is obtained a result which is much improved over the result obtained when unmodified styrene compound is employed in the practice of the present invention. More particularly, the utilization of herbicide carrier permits the growth-altering amount of styrene compound to be mixed in such quantity of ultimate treating material that adequate coverage of all plant parts or adequate admixture in growth medium can be obtained and thereby the desired growth-altering benefits of the present invention completely achieved. Some of these improved results of the utilization of herbicide carrier are obtained when employing the carrier in relatively small, but effective amounts. Generally, however, the improvement is best obtained by employing, for example, surface-active dispersing agent in an amount sufficient to emulsify styrene compound with water, for example, an amount which represents from 0.1 to 15 percent, by weight, of the total treating material, or finely divided carrier solid in an amount which represents from 40 to 99.5 percent, by weight, of the total treating material.

The exact concentration of styrene compound to be employed in compositions for application to plants or growth media is not critical and can vary considerably provided the required dosage of effective agent is supplied on the plant part treated. The concentration of styrene compound in liquid compositions employed to supply the desired dosage generally is from about 0.0001 to 50 percent by weight, although concentrations as high as 90 percent by weight are sometimes conveniently employed. In finely divided solid carrier compositions, the concentrations of styrene compound can be from 0.1 to 20 percent by weight. In compositions to be employed as concentrates, the styrene compound can be present in a concentration of from 5 to 98 percent by weight.

The quantity of treating composition to be applied can vary considerably provided that the required dosage of active ingredient is applied in sufficient of the finished composition to cover adequately the vegetation to be treated or to facilitate the penetration and distribution of the active agent in growth media. The required amount of the active agent conveniently can be supplied per acre treated in from 10 to 27,000 gallons or more of the liquid carrier or in from 10 to 2,000 pounds of the finely divided solid carrier. In the treatment of seedling weeds, good coverage is obtained when using from 10 to 60 gallons of finished spray composition per acre. Where leafy vegetation is concerned, it is frequently desirable to employ up to 250 gallons or more of the finished spray composition per acre to assure complete coverage of the above ground portion of the vegetation. In the application of dusts to plant foliage, good results are obtained with from 40 to 2,000 pounds of finished dust per acre, the only requirement being that the required styrene compound dosage be supplied in sufficient dust to achieve good coverage of the foliage.

Liquid compositions containing the desired amount of active ingredient can be prepared by dissolving a styrene compound in an organic liquid carrier or by dispersing the styrene compound in water with or without the aid of a suitable surface active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the organic liquid carriers, the petroleum distillates are generally preferred. The aqueous compositions can contain one or more water immiscible solvents for the styrene compound. In such compositions, the carrier comprises an aqueous emulsion, i.e., a mixture of water, emulsifying agent and water immiscible solvent. The choice of dispersing and emulsifying agent and the amount thereof employed is dictated by the nature of the composition and by the ability of the agent to facilitate the dispersion of styrene compound in the carrier to produce the desired composition. Dispersing and emulsifying agents which can be employed in the compositions include the condensation products of alkylene oxides with phenols and organic acids, alkyl aryl sulfonates, polyoxyalkylene derivatives of sorbitan esters, complex ether alcohols, mahogany soaps, and the like.

In the preparation of dust compositions, the active ingredient is dispersed in and on a finely divided solid carrier such as clay, talc, chalk, gypsum, bentonite, fuller's earth, attapulgite, and the like. In such operation, the finely divided carrier is mechanically mixed or ground with styrene compound. Depending upon the proportion of ingredients, these dust compositions can be employed as concentrates and subsequently diluted with additional solid carrier or with lquid or solid surface active dispersing agent to obtain the desired amount of active ingredient in a composition adapted to be employed for the suppression of the growth of the plants. Also, such dust compositions can be dispersed in water, preferably with the aid of a surface-active dispersing agent, to form spray mixtures.

Satisfactory results are obtained when a styrene compound or a composition comprising a styrene compound, is combined with other agricultural materials intended to be applied to plants, plant parts, or their habitats. Such materials include fertilizers, fungicides, insecticides, other herbicides, soil conditioning agents, and the like.

When operating in accordance with the present invention, a growth-altering amount of a styrene compound is applied to a plant part in any convenient fashion. Applications to a growth medium can be carried out by simply mixing with the medium, such as by applying to the surface of soil and thereafter dragging or discing into the soil to the desired depth or by employing a liquid carrier to accomplish the penetration and impregnation. The application of spray and dust compositions to the surface of soil or to the above ground surfaces of plants can be carried out by conventional methods, e.g., power dusters, boom and hand sprayers and spray dusters.

In a further method, the distribution of a styrene compound in soil can be accomplished by introducing the agent in the water employed to irrigate the soil. In such procedures, the amount of water can be varied with the porosity and water holding capacity of the soil to obtain a desired depth of distribution of the agent.

Other components of the habitat of a plant can be employed in the transfer of the agent of the present invention to a plant or plant part.

In addition, the present method comprehends also the employment of an aerosol composition containing a styrene compound as an active compound. Such a composition is prepared according to conventional methods wherein the active ingredient is dispersed in a solvent, and the resultant dispersion mixed with a propellant in liquid state. Such variables as the particular active ingredient to be used and the particular plant part to be treated will determine the identity of the solvent and the concentration of the active ingredient therein. Examples of suitable solvents are water, acetone, isopropanol, and 2-ethoxyethanol. Also, employment of styrene compound in pastes, gels, foams, invert emulsions, and the like, as well as pigmented or unpigmented pelleted solids is comprehended.

*Example 1*

In separate operations, aqueous compositions containing a styrene compound are prepared as follows:

Four parts by weight of one of the styrene compounds, 0.08 part of sorbitan trioleate (Span 85), and 0.02 part of a sorbitan monooleate polyoxyethylene derivative (Tween 80) are dispersed in 40 milliliters of acetone to produce a concentrate composition in the form of a water-dispersible liquid containing one of the styrene compounds as sole active agent. The compounds employed in these procedures include the following:

$\alpha$-(2,2,2-trichloroethyl)styrene;
$\alpha$-(2,2,2-trichloroethyl)-meta-isopropylstyrene;
$\alpha$-(2,2,2-trichloroethyl)-para-methylstyrene;
$\alpha$-(2,2-dichloroethyl)styrene;
$\alpha$-(2-bromo-2-chloroethyl)styrene;
$\alpha$-(2.2-dichloroethyl)-para-methylstyrene;
$\alpha$-(2,2,2-trichloroethyl)-3,4-dichlorostyrene;
$\alpha$-(2,2-dichloroethyl)-3,4-dichlorostyrene;
$\alpha$-(2,2,2-trichloroethyl)-meta-methylstyrene;
$\alpha$-(2,2,2-trichloroethyl)-3,4-dimethylstyrene;
$\alpha$-(2,2-dichloroethyl)-3,4-dimethylstyrene; and
$\alpha$-(2,2-dichloropropyl)styrene.

Portions of these concentrate compositions are dispersed in separate portions of water to provide aqueous compositions each containing 0.44 pound of one of the compounds per 100 gallons of ultimate aqueous mixture.

*Example 2*

In other procedures, $\alpha$-(2,2,2-trichloroethyl)-para-chlorostyrene is formulated in water with an alkyl aryl sulfonate (Nacconol NR) and a substituted benzoid alkyl sulfonic acid (Daxad No. 27) to produce an aqueous spray composition. In such operations, the materials are ballmilled together to produce a composition containing $\alpha$-(2,2,2-trichloroethyl)-para-chlorostyrene, 300 parts by weight of Nacconol NR, and 300 parts by weight of Daxad No. 27 per million parts by weight of ultimate aqueous mixture. This composition is dispersed in a further amount of water to prepare an aqueous composition containing 0.44 pound of the styrene compound per 100 gallons of ultimate aqueous mixture.

*Example 3*

The compositions of Examples 1 and 2 are employed for the treatment of seed beds of good agricultural soil which have been prepared and seeded to Japanese millet, radish, sorghum (milo) and wild oats. In the treating operations, the compositions are applied to the seed beds as a soil drench and at a rate of about 0.43 acre inch of aqueous composition per acre to supply substantially uniform dosages of 50 pounds of one of the styrene compounds per acre. This dosage corresponds to a concentration, within the soil depth penetrated, of about 82 parts by weight of styrene compound per million parts by weight of soil. Other seed beds similarly prepared and seeded are left untreated to serve as checks.

After three weeks the seed beds are examined to ascertain what control of the growth of seeds and emerging seedlings is obtained. The results are set forth in the following table:

| Subject Compound | Percent Kill and Control of the Growth of Seeds and Emerging Seedlings | | | |
|---|---|---|---|---|
| | Millet | Radish | Wild Oats | Sorghum* |
| α-(2,2,2-trichloroethyl)styrene | 100 | 0 | 100 | 98 |
| α-(2,2,2-trichloroethyl)-meta-isopropylstyrene | 95 | 0 | 98 | 98 |
| α-(2,2,2-trichloroethyl)-para-methylstyrene | 95 | 0 | 95 | 95 |
| α-(2,2,2-trichloroethyl)-para-chlorostyrene | 98 | 0 | 100 | 98 |
| α-(2,2-dichloroethyl)styrene | 100 | 30 | 100 | 100 |
| α-(2-bromo-2-chloroethyl)styrene | 100 | 0 | 100 | 100 |
| α-(2,2-dichloroethyl)-para-methylstyrene | 95 | 0 | 95 | 98 |
| α-(2,2-trichloroethyl)-3,4-dichlorostyrene | 98 | 0 | 98 | 98 |
| α-(2,2-dichloroethyl)-3,4-dichlorostyrene | 95 | 0 | 90 | 98 |
| α-(2,2,2-trichloroethyl)-meta-methylstyrene | 98 | 0 | 100 | 98 |
| α-(2,2,2-trichloroethyl)-3,4-dimethylstyrene | 95 | 0 | 95 | 100 |
| α-(2,2-dichloroethyl)-3,4-dimethylstyrene | 95 | 0 | 95 | 98 |
| α-(2,2-dichloropropyl)styrene | 100 | 0 | 100 | 100 |

*Milo.

At the time of observation, the check areas show populous and vigorously growing stands of the named plant species.

Example 4

Portions of various of the concentrate compositions, each containing a styrene compound, as described in Examples 1 and 2, are dispersed in water to prepare aqueous spray compositions each containing 0.04 pound of one of the styrene compounds per 100 gallons of ultimate mixture. These compositions are employed for the treatment of seed beds and observations made of the control of the growth of the seeds and emerging seedlings of various grass species and broadleaf plants. The grass species include crabgrass, wild oats, Sudan grass, meadow fescue and Japanese millet; and the broadleaf plants, cucumber, pinto beans, and radish. In the evaluation, the compositions are employed to treat seed beds of good agricultural soil which have been prepared and seeded with the named plant species. In the treating operations, the compositions are applied as a soil drench and at a rate of 0.43 acre inch of composition per acre to supply a substantially uniform dosage of 5 pounds of the test styrene compound per acre. This dosage corresponds to a concentration of about 8.2 parts by weight of styrene compound per million parts by weight of soil to the depth penetrated. Other beds similarly seeded with the named plant species are left untreated to serve as checks. After three weeks the treated and check areas are examined to ascertain the percent kill and control of the growth of seeds and emerging seedlings. The results are set forth in the following table:

At the time of the observations, abundant and rapidly growing stands of the named plant species are found in the check areas.

Example 6

A portion of the concentrate composition containing α-(2,2,2-trichloroethyl)styrene as described in Example 1 is dispersed in water to produce an aqueous spray composition containing 10,000 parts of active agent per million parts by weight of resulting composition. This composition is applied as a foliage spray to plants of various grass and broadleaf species, the plants being of two to four inches height, and in seed beds. The treatments are carried out with conventional spray equipment, the plants being sprayed to the point of run-off.

These applications correspond to a dosage of about 20 pounds of active agent per acre. Similar beds of the plant species are left untreated to serve as checks. After about two weeks, the plots are examined to ascertain what control of the growth of the plants is obtained. The plant species employed, together with the results of the observations, are set forth in the following table:

PERCENT KILL AND CONTROL OF THE GROWTH OF SEEDLING SPECIES

Radish _____ 0
German millet _____ 90
Crabgrass _____ 98
Pinto bean _____ 20
Marigold _____ 40
Sudan grass _____ 80
Meadow fescue _____ 50
Japanese millet _____ 90

| Test Styrene Compound | Percent Kill and Control of the Growth of Seeds and Emerging Seedlings | | | | | | | |
|---|---|---|---|---|---|---|---|---|
| | Crabgrass | Sudan grass | Japanese millet | Meadow fescue | Wild oats | Cucumber | Pinto beans | Radish |
| α-(2,2,2-trichloroethyl)styrene | 99 | 100 | 100 | 100 | 100 | 0 | 0 | 0 |
| α-(2,2,2-trichloroethyl)-para-chlorostyrene | 100 | 100 | 98 | 100 | 100 | 0 | 0 | 0 |

At the time of observation, abundant and rapidly growing stands of the named plant species are found in the check areas.

Example 5

Portions of various concentrate compositions containing styrene compound as described in Examples 1 and 2 are dispersed in water to produce aqueous spray compositions each containing 0.08 pound of one of the styrene compounds per 100 gallons of ultimate mixture. These compositions are employed according to the procedures of Example 4 except that there is supplied to the soil a substantially uniform dosage of 2.5 pounds per acre of test styrene compound. The results of these procedures are presented in the following table:

At the time of the observation, the check area supported a populous growth of all plant species.

Example 7

Aqueous spray compositions of various concentrations of styrene compounds, are each applied separately as a foliage spray to groups of plants of various grass and broadleaf species growing in seed beds, the plants being of from 2 to 4 inches height. The treatments are carried out with conventional spray equipment, the plants being sprayed to the point of run-off.

Similar beds of the plant species are left untreated to serve as checks. After about two weeks, the plots are examined to ascertain what control of the growth of

| Test Styrene Compound | Percent Kill and Control of the Growth of Seeds and Emerging Seedlings | | | | | | | |
|---|---|---|---|---|---|---|---|---|
| | Crabgrass | Sudan grass | Japanese millet | Meadow fescue | Wild oats | Cucumber | Pinto beans | Radish |
| α-(2-bromo-2-chloroethyl)styrene | 100 | 100 | 90 | 100 | 90 | 0 | 20 | 0 |
| α-(2,2,2-trichloroethyl)-meta-methylstyrene | 100 | 100 | 95 | 100 | 85 | 0 | 0 | 0 | plants is obtained. The plant species employed, the identity and concentration of styrene compound in the spray composition, and the number of pounds of test compound applied per acre, together with the results of the observations, are set forth in the following table:

from 1 to 4 molecular proportions of said halogenated compound. The amount of each component of the catalyst system is critical only in that the components must be present in such amounts as in combination to exert a catalytic effect on the reaction.

| Test Styrene Compound | Concentration of Styrene Compound in Spray Composition in Parts per Million | Number of Pounds of Styrene Compound per Acre | Percent Kill and Control of the Growth of Seeds and Emerging Seedlings | | | | |
|---|---|---|---|---|---|---|---|
| | | | Crabgrass | Sudan grass | Japanese millet | Wild oats | Radish |
| α-(2,2,2-trichloroethyl)-para-chlorostyrene | 10,000 | 20 | 95 | 95 | 98 | 95 | 0 |
| α-(2,2,2-trichloroethyl)-3,4-dichlorostyrene | 5,000 | 10 | 80 | 95 | 95 | 90 | 0 |

90 parts by weight of one of the styrene compounds and 10 parts by weight of a sorbitan monolaurate polyoxyethylene derivative (Tween 20) are mixed together to prepare a concentrate composition in the form of a water dispersible composition.

Also, 25 parts by weight of one of the styrene compounds, 62 parts of fuller's earth, 10 parts of diatomaceous earth, 2 parts of an alkyl aryl sulfonate (Nacconol NR) and 1 part of a polymerized sodium salt of substituted benzoid alkyl sulfonic acid (Daxad No. 27) are mechanically mixed and ground together to prepare a concentrate composition in the form of a wettable powder.

These concentrate compositions can be dispersed in water to prepare aqueous compositions which have very desirable wetting and penetrating properties. The latter aqueous compositions are adapted to be employed to treat plants, plant parts, and their habitats and distribute one of the styrene compounds thereon in growth-altering concentrations.

The compounds to be employed according to the present invention are prepared by the reaction of, in the first place, a halogenated compound of the formula

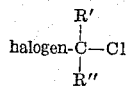

wherein the term halogen represents halogen of molecular weight equal or greater than that of R' with, in the second place, an alpha-methylstyrene compound of the formula

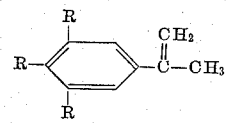

The reaction, which is ordinarily exothermic, takes place at temperatures of from −50° to 200° C., and preferably, at temperatures of from 25° to 100° C. The reaction proceeds in the presence or absence of a reaction medium. Aliphatic hydrocarbons and ethers are classes of organic compounds which can serve as reaction medium. Conveniently, when either said halogenated compound or said α-methylstyrene compound is a liquid, excess of such reactant is employed as reaction medium.

The reaction proceeds in the presence of a free-radical initiator, which is preferably a catalyst system comprising an organic amine compound and a copper material. The identity of the organic amine compound is not critical; preferred amine compounds include piperidine, diethylamine, diisopropylamine, dibenzylamine, dicyclohexylamine, hexylamine, 3-picoline, butylamine, and 2,4-dimethylaniline. The identity of the copper material is not critical; preferred materials include cupric bromide, copper acetate, cupric chloride, metallic copper, and especially anhydrous cuprous chloride.

The amounts of the reactants to be employed are not critical, some product being obtained when employing the reactants in any amounts. Conveniently, it is preferred to employ amounts of reactants which represent one molecular proportion of α-methylstyrene compound and In carrying out the reaction, the reactants and the organic amine copper material catalyst system are contacted together for a period of time in the reaction temperature range. Some of the desired product is formed immediately upon the contacting together of the catalyst and reactants, but, given longer reaction time, substantially higher yields result. Yields of desired product are also increased if, at the termination of the reaction period, the reaction mixture is heated to a temperature of about 125° C. for a period of time, or the reaction mixture is refluxed with a base, such as, for example, alcoholic KOH, or an organic amine compound.

Also, in a modification of the above procedures, there is employed as free-radical initiator, particularly when each of R' and R'' represent chlorine, gamma-radiation, ultraviolet light, heat, or a peroxide catalyst.

I claim:

1. A method of suppressing plant growth which comprises applying to a plant part an at least growth-suppressing amount of styrene compound of the formula

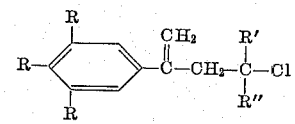

wherein each R independently represents a member selected from the group consisting of hydrogen, bromo, chloro, and loweralkyl being of from 1 to 3, inclusive, carbon atoms; R' represents a member selected from the group consisting of bromo and chloro; and R'' represents a member selected from the group consisting of hydrogen, methyl, and chloro.

2. The method of claim 1 wherein the styrene compound is α-(2,2,2-trichloroethyl)styrene.

3. The method of claim 1 wherein the styrene compound is α-(2,2,2-trichloroethyl)-para-chlorostyrene.

4. The method of claim 1 wherein the styrene compound is α-(2,2-dichloropropyl)styrene.

5. A plant growth suppressing composition consisting essentially of an effective amount of from 5 to 98 percent by weight of a styrene compound of the formula

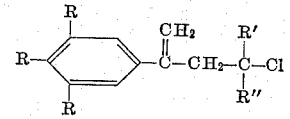

wherein each R independently represents a member selected from the group consisting of hydrogen, bromo, chloro, and loweralkyl being of from 1 to 3, inclusive, carbon atoms; R' represents a member selected from the group consisting of bromo and chloro; and R'' represents a member selected from the group consisting of hydrogen, methyl, and chloro, together with a finely divided solid carrier and sufficient surface-active dispersing agent to emulsify said compound with water.

6. Composition of claim 5 wherein the styrene compound is α-(2,2,2-trichloroethyl)styrene.

7. Composition of claim 5 wherein the styrene compound is α-(2,2,2-trichloroethyl)-para-chlorostyrene.

8. Composition of claim 5 wherein the styrene compound is α-(2,2-dichloropropyl)styrene.

9. Aqueous dispersion of the composition claimed in claim 5, the active ingredient in such dispersion being present in the amount of at least 0.0001 percent by weight.

References Cited

UNITED STATES PATENTS 2,829,178  4/1958  Dreisbach et al.
3,112,346  11/1963  Weil et al.

OTHER REFERENCES

Kharasch et al.: Chemical Abstracts, vol. 48, col. 1939(i) 1940.

Detar et al.: Chemical Abstracts, vol. 51, col. 3522(g) to 3523(b) 1957.

Zakharkin et al.: Chemical Abstracts, vol. 52, col. 7177(b) 1958.

JAMES O. THOMAS, Jr., *Primary Examiner.*

LEWIS GOTTS, *Examiner.*